Patented Aug. 18, 1936

2,051,119

UNITED STATES PATENT OFFICE 2,051,119

VIOLANTHRONE DERIVATIVES AND PROCESS OF PREPARING THEM

Alexander John Wuertz and William Hiram Lycan, South Milwaukee, Wis., assignors to E. I. du Pont de Nemours & Company, Wilmington, Del., a corporation of Delaware No Drawing. Application May 3, 1933, Serial No. 669,205

12 Claims. (Cl. 260—61)

This invention relates to a process of preparing derivatives of violanthrones and the products resulting therefrom. It especially appertains to the substances produced by the reaction or condensation of aldehydes and violanthrones.

It is well known by those skilled in the art that compounds known as benzanthrones are produced when compounds of the anthraquinone series are condensed with glycerine (see United States of America Patents 818,992 of April 24, 1906 and 809,892 of January 9, 1906 to Bally and Isler and 786,085 of March 28, 1905 to Bally). When benzanthrones are fused with caustic alkali under appropriate conditions there are produced compounds known as violanthrones (see Color Index 1099).

Compounds having the violanthrone structure are powerful vat dyes. Since their discovery a tremendous amount of research work has been expended upon them. This work has developed the fact that two positions of such a nucleus are more reactive than the others. It is the general belief that the Bz-2, Bz-2' positions are the ones showing this particular activity.

It has now been found that new chemical compounds, new vat dyes and new intermediates may be produced by condensing (or reacting) aldehydes with violanthrones having these active positions free (or unoccupied).

This invention had for an object the preparation of new chemical compounds. Other objects were the preparation of carbon compounds in a very desirable physical form and in a high state of purity. Still further objects were to produce new vat dyes, new derivatives of violanthrones and to devise new chemical processes. A general advance in the art and other objects which will appear hereinafter are also contemplated.

These objects are accomplished by treating violanthrones, not substituted in the Bz-2, Bz-2' positions, with aldehydes in the presence of aluminum chlorides until one molecular proportion of the aldehyde has been condensed or reacted with one molecular proportion of the violanthrone.

The invention will be further understood from a consideration of the following detailed description and specific examples in which the parts are given by weight.

Example I

Five hundred (500) parts of antimony trichloride were heated to 180° C. To this melt was added 250 parts of anhydrous aluminum chloride under agitation. During the addition the temperature dropped to 100°–120° C. It was raised to 150°–155° C. in order to permit the aluminum chloride to digest completely. When a clear solution was obtained the temperature was lowered to 100°–120° C. When this was accomplished 100 parts of violanthrone were introduced into the melt within a period of one half to one hour. The temperature was then allowed to drop to 95°–100° C. and 35–40 parts of metaldehyde $(CH_4O)_4$ were added in a period of 15–30 minutes. After a brief period of agitation the temperature was raised to 140°–150° C. and maintained within the said limits for approximately 4–6 hours. The smooth melt was then drowned in a cold solution of hydrochloric acid (containing 5–10% HCl), heated to 50–90° C. and subsequently filtered. The residue was washed with 2–5% hot hydrochloric acid and then with hot water until free of acid. The residual product, which was a dark blue paste, assumed, when dry, the physical appearance of a violet powder. Its sulphuric acid solution was reddish blue to blue. Some degree of variation of the tints in strong sulphuric acid was found to be dependent upon the extent of the reaction. When a larger excess of the metaldehyde was used the solution shifted from a reddish blue to almost a pure blue and vice versa. The new product dyes from blue to reddish blue alkaline hydrosulfite vat in pure blue shades which, when oxidized by exposure to the air, changed to bright blue shades. When dyed on cotton this new product produces shades which are exceedingly fast to chlorine, washing and sunlight. It may be used for printing purposes when prepared in paste form.

Example II

A process similar to that of Example I was carried out replacing the metaldehyde with paraaldehyde. A product having similar properties to those of the product of Example I was produced.

Example III

A process similar to that of Example I was carried out replacing the metaldehyde with paraformaldehyde. A product having similar properties to those of the product of Example I was produced.

Example IV

To a melt of 500 parts of antimony trichloride and 250 parts of anhydrous aluminum chloride, prepared in the same manner as set forth in Example I, there was added 100 parts of violanthrone while maintaining the temperature at 100-120° C. To this melt was further added 30-35 parts of ortho-chloro-benzaldehyde at 100°-110° C. The addition of the aldehyde was carried out over a period of 30-45 minutes so as not to permit the temperature to rise too rapidly. When the ingredients were properly digested within the melt, the temperature was raised to 100°-200° C. and maintained within these limits for a period of 3-6 hours, after which time the fluid melt was drowned in a hydrochloric acid solution and the reaction product isolated in precisely the same manner as indicated in Example I. While this product has properties similar to those of the product of Example I, it dyes to slightly greener shades. It was noted that the alkaline hydrosulfite vat was characterized by a remarkable red fluorescence. Elementary analysis of the end product indicates that the chlorine atom has remained in the phenyl nucleus.

Processes similar to that of Example III, were carried out replacing the ortho-chloro-benzaldehyde with benzaldehyde, para-chloro-benzaldehyde, meta-nitro-benzaldehyde, naphthaldehyde, chloro-naphthaldehydes, and nitro-naphthaldehydes. New and valuable compounds and dyes, ranging in tints from greenish blue to reddish blue, having exceptional fastness to bleach and washing, and other properties generally similar to the product of Example III, were produced.

Example V

To a melt of essentially the same proportion of antimony trichloride and aluminum chloride, as specified in Example I, there was added 100 parts of violanthrone at 110°-120° C. under good agitation until complete digestion had taken place. Thereafter, 50-60 parts of anthraquinone-2-aldehyde were introduced into the smooth melt. When this was completed the temperature was raised by heating to 160°-200° C. and maintained within these limits for a period of 2-3 hours or until a test sample showed no further evidence of a color change in sulfuric acid. The color change developed in this instance was a brilliant blue differing from the red violet color of violanthrone. The end product was isolated in the manner similar to that described in Examples I and IV. The product thus obtained dyes cotton in pure blue shades from an alkaline hydrosulfite vat. These dyeings exhibited remarkable fastness properties when exposed to light, acids, alkalies, scrubbing and bleaching.

In the manner described in the previous example, condensations of violanthrones with 1-chloro-anthraquinone-2-aldehyde, 1-nitro-anthraquinone-6-aldehyde, 1-amino-anthraquinone-2-aldehyde and 1-amino-anthraquinone-6-aldehyde, were carried out. There were obtained compounds and dyes which exhibited properties similar to those of the preceding example and which dyed cotton in hues ranging from reddish blue to greenish blue.

The catholicity of the invention is apparent from the preceding description and specific examples. As has been shown, acyclic and carbocyclic aldehydes are especially suitable for the reactions utilized in this invention. The invention is not limited to the employment of such compounds however, because heterocyclic aldehydes and aldehydes which involve a plurality of types of structure in the nucleus to which the aldehyde group is attached, may be satisfactorily utilized. Aromatic compounds, such as those of the benzene, naphthalene, anthracene and phenanthrene series, are deserving of special mention. The condensed ring compounds of the naphthalene and anthraquinone series are especially desirable. The benzaldehydes and naphthaldehydes are quite advantageously used.

The amount of antimony trichloride or other metal halide used as an adjuvant in the aluminum chloride melt may be varied over a wide range. If desired the antimony chloride may be omitted entirely. The addition of other metal chlorides, such as sodium and zinc chloride to the melt for the purpose of producing proper fluidity, melting point or other physical and/or chemical conditions may be made if found expedient.

The temperature limits set forth in the foregoing examples are capable of wide variation without harmful change in results. Ordinarily, the temperature range of 90°-180° C. for the condensation is preferred. Temperatures outside this range may be used at the sacrifice of time and/or yield of product. The temperatures for producing homogeneity in the melt and for drowning the fusion are not especially significant and depend upon the convenience of the person carrying out the reaction.

Time limits are likewise elastic and no detriment to the product has been noted after prolonged heating in the reaction melt.

The proportions of the reactants may be widely varied without apparently affecting the results. An excess of either reactant remains in the melt when the reaction is complete and may be removed from the final product by suitable means. The reactant present in the least molecular proportion is quantitatively consumed during the reaction. Any excess of violanthrone may be separated from the condensation product by virtue of a diverse solubility in such solvents as concentrated sulphuric acid, organic solvents and alkaline hydrosulfite solutions.

The exact change taking place in the violanthrone molecule during the treatment with an aldehyde, is not known. It is believed that a condensation product in which the violanthrone nucleus is linked through its Bz-2 position to the aldehyde body with which it was reacted is produced. However, it is not desired to limit the invention to any particular theory and the above explanation is given only for the purpose of aiding in understanding the invention. This invention, or discovery, has numerous advantages as will be apparent to those skilled in the art. As outstanding among these, there may be mentioned the production of a new series of vat dyes and vattable products. New and important colored compounds, coloring matters and intermediates are now made available for the art.

As many apparently widely different embodiments of this invention may be made without departing from the spirit and scope thereof, it is to be understood that we do not limit ourselves to the specific embodiments thereof except as defined by the appended claims.

We claim:

1. The process which comprises condensing an aldehyde with a violanthrone whose Bz-2, Bz-2' positions are unoccupied.

2. The process of claim 1 when the treatment is carried out in the presence of a mixture of aluminum chloride and antimony chloride.

3. The products obtainable by condensing an aldehyde with a violanthrone whose Bz2, Bz2' positions are unoccupied.

4. The process which comprises heating 500 parts of antimony tri-chloride to 180° C., adding 250 parts of anhydrous aluminum chloride, maintaining a temperature of about 150°–155° C. until the aluminum chloride digests, lowering the temperature to 100°–120° C., adding 100 parts of violanthrone over a period of one-half to one hour, allowing the temperature to drop to 100°–110° C., adding 30–35 parts of ortho-chloro-benzaldehyde over a period of 30–45 minutes, allowing the resultant mixture to digest, raising the temperature to 100°–200° C. for a period of 3–6 hours, drowning the resultant in a 5% hydrochloric acid solution, heating to 50°–90° C. and filtering to recover the final solid.

5. The product obtainable according to the process set out in claim 4 which is a violet powder giving a reddish-blue sulphuric acid solution, a reddish-blue alkaline hydrosulfite vat from which cotton is dyed blue shades and whose alkaline hydrosulfite vat is characterized by a red fluorescence.

6. The process which comprises condensing one proportion of an aldehyde with one molecular proportion of a violanthrone.

7. The product obtainable by condensing one molecular proportion of an aldehyde with one molecular proportion of a violanthrone whose Bz2, Bz2' positions are unoccupied, said condensation being carried out in the presence of a mixture of aluminum chloride and antimony trichloride.

8. The process which comprises condensing anthraquinone-2-aldehyde with violanthrone.

9. The process which comprises condensing para-formaldehyde with violanthrone.

10. The process which comprises condensing ortho-chloro-benzaldehyde with violanthrone.

11. The product obtainable by condensing anthraquinone-2-aldehyde with violanthrone.

12. The product obtainable by condensing para-formaldehyde with violanthrone.

ALEXANDER JOHN WUERTZ.
WILLIAM HIRAM LYCAN.

CERTIFICATE OF CORRECTION.

Patent No. 2,051,119.

August 18, 1936.

ALEXANDER JOHN WUERTZ, ET AL.

It is hereby certified that error appears in the printed specification of the above numbered patent requiring correction as follows: Page 3, second column, line 2, claim 6, before the word "proportion" insert molecular; and that the said Letters Patent should be read with this correction therein that the same may conform to the record of the case in the Patent Office.

Signed and sealed this 8th day of December, A. D. 1936.

(Seal)

Henry Van Arsdale
Acting Commissioner of Patents.